US012576569B2

(12) United States Patent
Chromy et al.

(10) Patent No.: US 12,576,569 B2
(45) Date of Patent: Mar. 17, 2026

(54) METHOD FOR ADJUSTING THE CLOSING FORCE OF A MOLD OF A PLASTICS PROCESSING MACHINE, IN PARTICULAR AN INJECTION MOLDING MACHINE

(71) Applicant: Wittmann Battenfeld GmbH, Kottingbrunn (AT)

(72) Inventors: Patrick Chromy, Vienna (AT); Ben Pearson, Vienna (AT)

(73) Assignee: WITTMANN BATTENFELD GMBH, Kottingbrunn (AT)

( * ) Notice: Subject to any disclaimer, the term of this patent is extended or adjusted under 35 U.S.C. 154(b) by 854 days.

(21) Appl. No.: 17/943,496

(22) Filed: Sep. 13, 2022

(65) Prior Publication Data

US 2023/0078217 A1    Mar. 16, 2023

(30) Foreign Application Priority Data

Sep. 15, 2021    (DE) ..................... 10 2021 123 917.6

(51) Int. Cl.
*B29C 45/76*        (2006.01)

(52) U.S. Cl.
CPC ..................... *B29C 45/7653* (2013.01); *B29C 2945/76013* (2013.01); *B29C 2945/7623* (2013.01);
(Continued)

(58) Field of Classification Search
CPC ...... B29C 45/7653; B29C 2945/76013; B29C 2945/7623; B29C 2945/76508; B29C 2945/76869
(Continued)

(56) References Cited

U.S. PATENT DOCUMENTS

| | | | |
|---|---|---|---|
| 8,512,608 | B2 | 8/2013 | Koike |
| 9,597,827 | B2 | 3/2017 | Hirose |
| 2006/0197248 | A1 | 9/2006 | Kato |

FOREIGN PATENT DOCUMENTS

| | | |
|---|---|---|
| DE | 102011076041 A1 | 11/2011 |
| DE | 102015000219 A1 | 7/2015 |
| DE | 102014014232 B4 | 10/2020 |

OTHER PUBLICATIONS

European Search Report dated Jan. 27, 2023 regarding parallel Application No. EP 22 19 0405. 2 pages.

*Primary Examiner* — Christina A Johnson
*Assistant Examiner* — Xue H Liu
(74) *Attorney, Agent, or Firm* — LUCAS & MERCANTI, LLP; Klaus P. Stoffel

(57)        ABSTRACT

A method for adjusting the closing force of a mold of a plastics processing machine. In order to work with an optimized closing force, the method comprises the steps of: a) in a first production cycle: Closing the mold with a nominal initial closing force and recording the mold deformation caused thereby and calculating the deformation work introduced by the mold deformation; b) in a subsequent further production cycle: Closing the mold with a reduced closing force and recording the resulting mold deformation and calculating the deformation work introduced by the mold deformation; c) Recording the determined deformation work versus the closing force, carrying out a linear extrapolation of the course of the deformation work versus the closing force and determining a reduced closing force which is at a predetermined percentage value of one of the previously determined deformation work; d) Carrying out the subsequent further production cycle with the determined reduced closing force.

7 Claims, 6 Drawing Sheets

(52) U.S. Cl.
    CPC .............. *B29C 2945/76508* (2013.01); *B29C 2945/76869* (2013.01)

(58) Field of Classification Search
    USPC ...................................................... 264/40.5
    See application file for complete search history.

SB01

SB02

SM13

POS

PO6

SM14

SM15

SM16

SM17

SM18

SM19

SM20

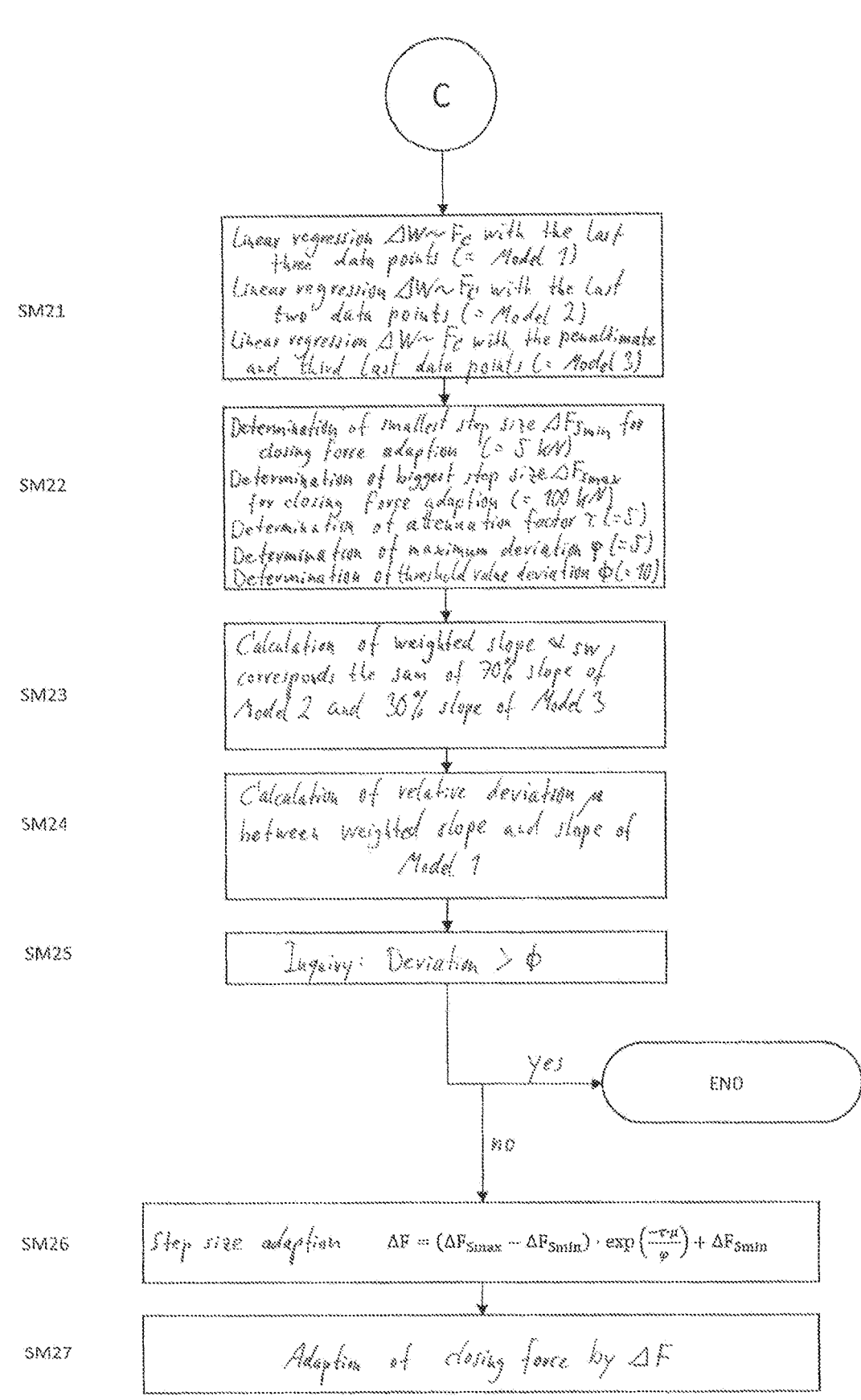

SM21  Linear regression $\Delta W \sim F_C$ with the last three data points (= Model 1)
Linear regression $\Delta W \sim F_C$ with the last two data points (= Model 2)
Linear regression $\Delta W \sim F_C$ with the penultimate and third last data points (= Model 3)

SM22  Determination of smallest step size $\Delta F_{Smin}$ for closing force adaption (= 5 kN)
Determination of biggest step size $\Delta F_{Smax}$ for closing force adaption (= 100 kN)
Determination of attenuation factor $\tau$ (=5)
Determination of maximum deviation $\varphi$ (=5)
Determination of threshold value deviation $\phi$ (=10)

SM23  Calculation of weighted slope $\alpha_{SW}$; corresponds the sum of 70% slope of Model 2 and 30% slope of Model 3

SM24  Calculation of relative deviation $\alpha$ between weighted slope and slope of Model 1

SM25  Inquiry: Deviation $> \phi$

Yes → END

No

SM26  Step size adaption     $\Delta F = (\Delta F_{Smax} - \Delta F_{Smin}) \cdot \exp\left(\frac{-\tau\mu}{\varphi}\right) + \Delta F_{Smin}$ SM27  Adaption of closing force by $\Delta F$

METHOD FOR ADJUSTING THE CLOSING FORCE OF A MOLD OF A PLASTICS PROCESSING MACHINE, IN PARTICULAR AN INJECTION MOLDING MACHINE

CROSS-REFERENCE TO RELATED APPLICATIONS

The present application claims priority of DE 10 2021 123 917.6, filed Sep. 15, 2021, the priority of this application is hereby claimed, and this application is incorporated herein by reference.

BACKGROUND OF THE INVENTION

The invention relates to a method for adjusting the closing force of a mold of a plastics processing machine, in particular an injection molding machine, wherein the mold has a spring constant, so that a mold deformation results when the mold is subjected to the closing force.

When operating a plastics processing machine, before plastic material is injected into the mold, the mold is pressurized by the clamping force and thus held closed. The plastic material is injected under high pressure. The closing force must be selected so that the mold always remains closed until the plastic material has solidified.

During injection molding, the plasticizing unit exerts an opening force on the mold during injection and the holding pressure phase. The clamping unit counteracts this opening force with the clamping force. If the opening force is greater than the clamping force, the mold opens in an uncontrolled manner and the process becomes unstable. The clamping force must therefore be selected to be greater than the opening force.

It is relatively time-consuming to set the optimum closing force of the mold. Therefore, the maximum clamping force of the machine is usually used to keep the mold reliably closed. However, this is not very favorable in terms of mold and machine wear.

The optimum would be to bring the closing force—taking into account a certain safety buffer—as close as possible to the opening force in order to keep the process as robust as possible.

Solutions have become known, one of which is described, for example, in DE 10 2014 014 232 B4. In this case, a reference cycle is run in a dry run, which provides information about the force or travel curve of the tool, taking into account the spring constant, i.e. the spring stiffness, of the tool. This makes it possible to calculate back to the force or displacement curve during operation of the machine, which can then be used to determine the optimum clamping force.

A disadvantage of this method is that a corresponding dry run is required before the actual production process in order to record the necessary data.

US 2006/0197248 A1 discloses a method for monitoring the mold clamping force in an injection molding machine, whereby readjustment of the clamping force takes place if deviations from a target force are detected in the course of production of a large number of molded parts.

SUMMARY OF THE INVENTION

The invention is based on the object of further developing a process of the type described above in such a way that, without further preparatory measures in the production process itself, an optimum closing force can be found with which the mold remains reliably closed, but which does not place an excessive load on the machine.

The solution of this problem by the invention is characterized in that the method comprises the following steps:

a) in a first production cycle: Closing the mold with a nominal initial closing force and recording the mold deformation caused by this and calculating the deformation work (energy difference between the not yet deformed and the maximum deformed tool) introduced by the mold deformation;

b) in a subsequent further production cycle: Closing the mold with a closing force which is reduced relative to the nominal initial closing force by a predetermined force difference and recording the mold deformation caused thereby and calculating the deformation work introduced by the mold deformation;

c) Recording the determined deformation works versus the closing force, performing a linear extrapolation of the course of the deformation works versus the closing force and determining a reduced closing force which is at a predetermined percentage value of one of the previously determined deformation works, wherein the predetermined percentage value of the deformation work is at most 20% of the previously determined deformation work;

d) Execution of the subsequent further production cycle with the determined reduced clamping force.

Preferably, not only two determinations of the deformation work are made, as explained, but three of them. In this case, after step b) above and before step c) above, the step is performed:

b1) in a subsequent further production cycle following step b): Closing the mold with a closing force which is reduced by a predetermined force difference compared with the closing force during the execution of step b) and recording the mold deformation caused thereby and calculating the deformation work introduced by the mold deformation, wherein the further determined deformation work is taken into account in the linear extrapolation of the course of the deformation work versus the closing force when carrying out step c).

Finally, a fourth value of the deformation work can optionally be included in the calculation, in which case the step is performed after step b1) above and before step c):

b2) in a subsequent further production cycle following step b1): Closing the mold with a closing force which is reduced by a further predetermined force difference compared with the closing force during the execution of step b1) and recording the mold deformation caused thereby and calculating the deformation work introduced by the mold deformation, wherein the further determined deformation work is taken into account in the linear extrapolation of the course of the deformation work versus the closing force when carrying out step c).

In particular, the linear extrapolation is performed by a straight line obtained by linear regression of the values of the deformation work over the closing force.

Said force difference is preferably between 25 kN and 75 kN, particularly preferably between 40 kN and 60 kN.

The process is carried out in particular in an injection molding machine.

Thus, the proposed solution relies on the consideration of the deformation work of the mold to determine the optimum closing force.

The deformation work $\Delta W$ of the mold, which is applied when the closing force is applied to the closed mold, is given by:

$$\Delta W = \frac{k_M \cdot (\Delta s_{C1}^2 - \Delta s_C^2)}{2} \text{ with}$$

$$\Delta s_{C1} = s_{C1} - s_{F0} \text{ and}$$

$$\Delta s_C = \Delta s_{C1} - s_C - s_{F0}$$

Here is $k_M$ the spring constant of the tool, $S_{C1}$ the position of the clamping unit before the plastic material is injected into the mold, but after the clamping force has been built up, $S_{F0}$ the position of the force-free closed clamping unit and $S_C$ the minimum measured position of the clamping unit from the injection start during the production cycle. The minimum measured position usually occurs in the holding pressure phase.

The spring constant $k_M$ of the tool can be calculated using the equation $$k_M = \frac{F_{C1} - F_{F0}}{\Delta s_{C1}}$$

$F_{C1}$ is the clamping force set by the machine operator at the same time that $s_{C1}$ is present, i.e. before injection but after the clamping force is build-up.

$F_{F0}$ is the clamping force at the same time when $s_{F0}$ is given, i.e. when the clamping unit is closed without force.

The present invention assumes that the optimum closing force is found when the working difference is positive, but close to zero.

Thus, the proposed method aims at finding the optimum closing force on the mentioned basis, i.e. by linear extrapolation a positive value close to zero is sought for the working difference.

The plastics processing machine, in particular the injection molding machine, is equipped with the necessary measuring elements to be able to determine forces and displacements.

Accordingly, the given closing force $F_{C1}$ can be measured by means of force sensors.

Furthermore, displacement measuring elements are used to record the position of the clamping unit (for example, in scanning steps of the software, which takes place every 2 ms).

Thus, the (average) position of the force-free closed clamping unit $s_{F0}$ can be detected, as well as the (average) force $F_{F0}$ when the clamping unit is closed force-free.

The (average) position $s_{c1}$ of the clamping unit can also be detected before injection but after the clamping force has been built up.

Thus, the difference $\Delta s_{C1}$ between the measured position of the clamping unit $s_{c1}$ shortly before injection but after the clamping force build-up of the force-free closed clamping unit $s_{F0}$ can be determined.

The spring constant $k_M$ of the mold can also be determined from the above relationship.

Furthermore, the difference $\Delta s_C$ between the minimum position of the clamping unit from injection start $s_c$ and the position of the force-free closed clamping unit $s_{F0}$ can be determined.

The difference of the deformation work $\Delta W$ can then be determined from these mentioned parameters.

The position of the clamping unit can be measured via a displacement sensor installed as standard. In order to obtain robust and valid values for the position of the clamping unit, it is advantageous to amplify the signal via an operational amplifier.

Accordingly, the proposed method finds the optimum clamping force during the normal production process. Thus, no dry run is necessary.

In addition to the method described above for finding the optimum closing force, a method for controlling the opening travel can also be used or added:

In this case, the operator defines a value for $\Delta s_c$, the software converts to a target difference of the deformation work. The target closing force is derived from the target difference of the deformation work by linear approximation.

If there are too few data points for a linear regression, two measurements are carried out on the basis of the current closing force (e.g.), each with a closing force increasing by a specified difference value (e.g. 50 kN). In the process, (e.g.) three difference works are recorded, namely at the currently set clamping force ($\Delta W_1$), at the currently set clamping force+difference value (e.g. 50 kN) ($\Delta W_2$), at the currently set closing force+another difference value (e.g. 100 kN) ($\Delta W_3$).

Then an iterative adjustment of the clamping force with automatic step size adjustment is performed until $\Delta s_c$ has been reached.

If the procedure described above for finding the optimum closing force has already been completed, the procedure for controlling the opening travel is simplified considerably. Here, sufficient data points are already available to form a linear regression model.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

In the drawing:

FIG. 5 shows for an embodiment of the proposed method the finding of an optimal closing force and FIG. 6 shows, for an embodiment of the proposed method, the iterative reduction of the closing force to find its optimal value.

DETAILED DESCRIPTION OF THE INVENTION

Figure 1:
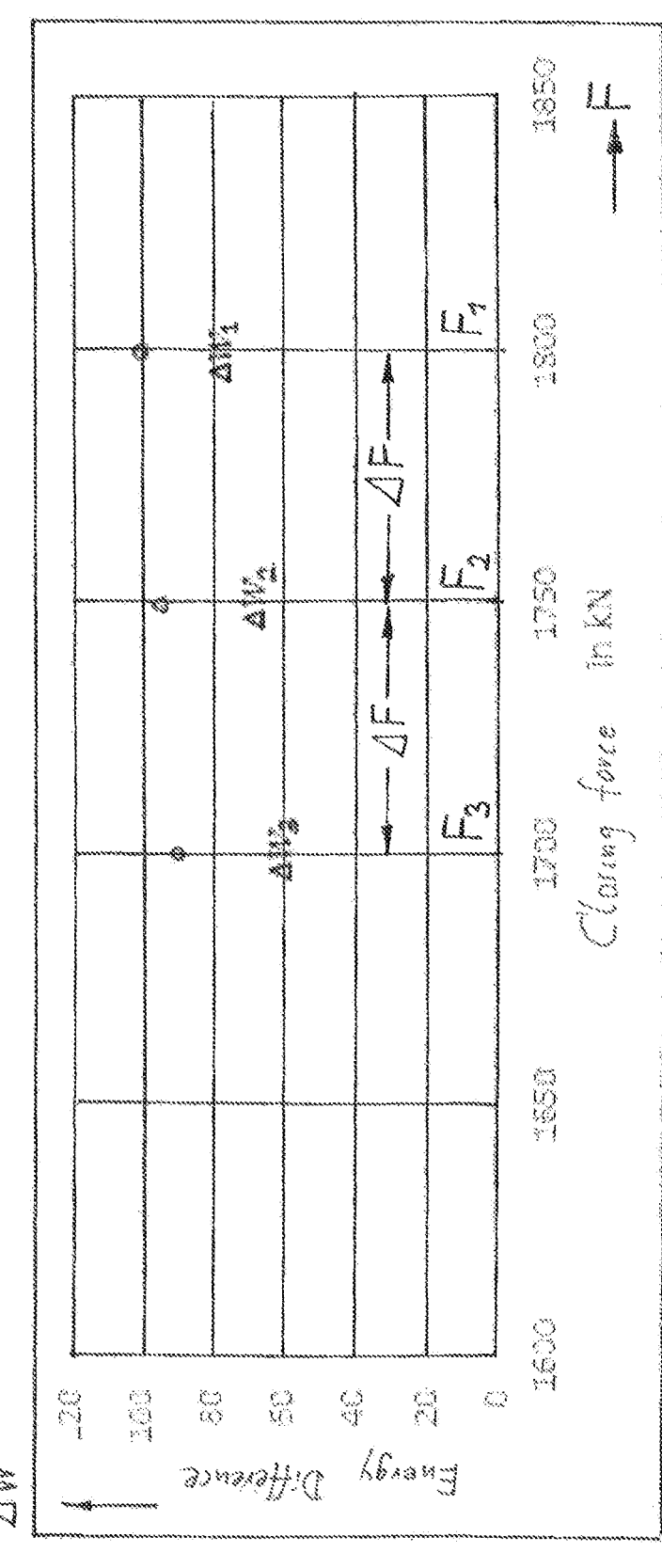
FIG. 1 shows schematically for three successive injection molding cycles the deformation work of the mold with decreasing clamping forces, wherein the deformation work being plotted as an energy difference over the clamping force of the mold.

FIG. 1 illustrates the beginning of the proposed method for finding an optimum closing force of the mold of an injection molding machine. In the coordinate system shown here, the closing force F of the mold is plotted on the abscissa and the energy difference $\Delta W$ according to the above formula is plotted on the ordinate.

According to this, a nominal initial state with a nominal clamping force $F_1$ first results in a value of $\Delta W_1$ for the energy difference. In the embodiment, a clamping force of 1,800 kN was selected as the initial state; this value can correspond in particular to the maximum clamping force of the mold. A first production cycle was carried out with this clamping force, i.e. the production of an injection molded part.

It should be mentioned here that the described process can of course also be used after a number of molded parts have already been produced. In this respect, the term first production cycle should be understood to mean that it is the first cycle with which the proposed process starts.

In a subsequent working cycle, in particular in the immediately following working cycle, a reduced closing force $F_2$ is then used. The closing force is therefore reduced by an amount $\Delta F$, which in the embodiment is 50 kN. Now, in the same way, a value $\Delta W_2$ is obtained for the deformation work introduced into the mold (differential work).

In a further subsequent working cycle, which follows on in particular from the second working cycle described, the closing force $F_3$ is reduced again. Again, this is reduced by an amount $\Delta F$, which in this case is also 50 kN. This results in an analogous value $\Delta W_3$ for the deformation work introduced into the mold.

Figure 2:
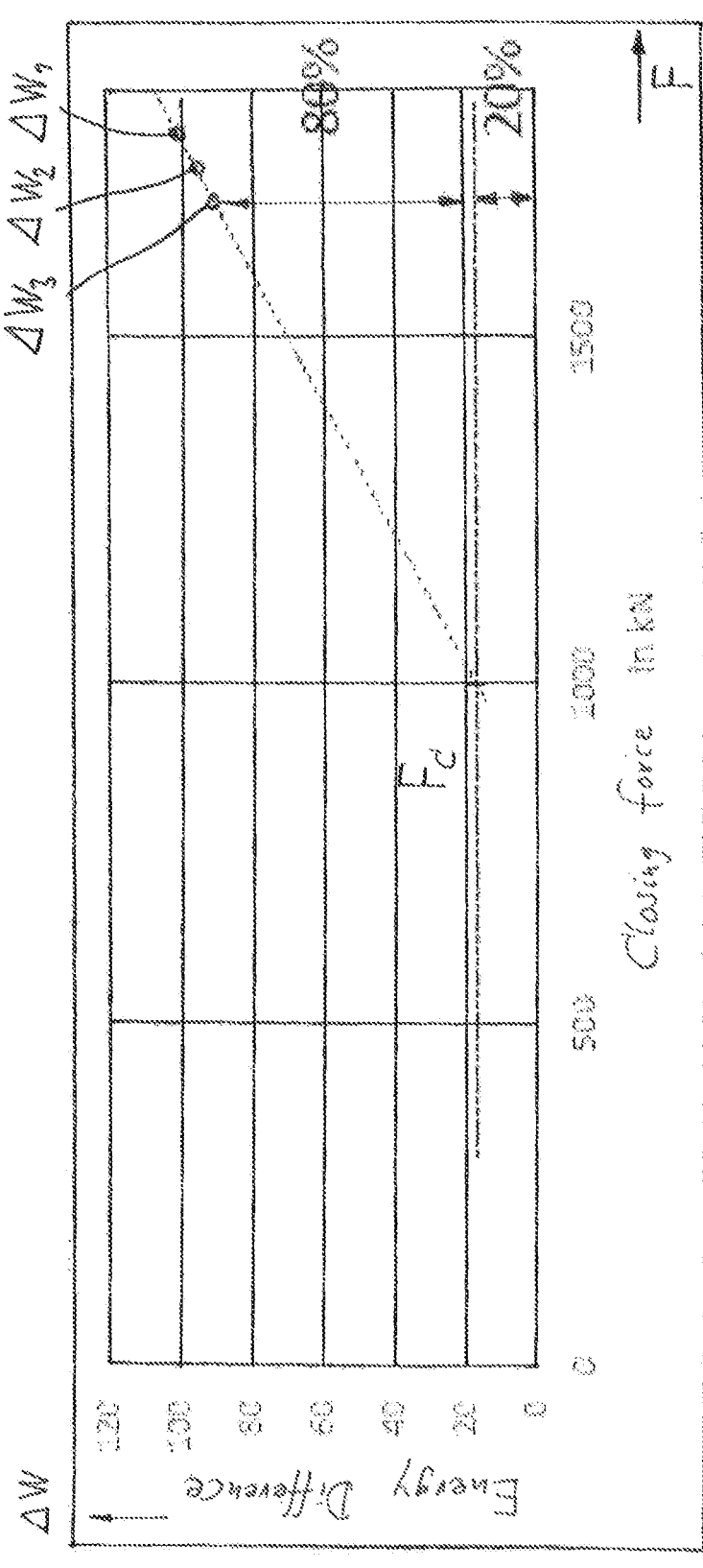
FIG. 2 shows schematically, on the basis of the representation according to FIG. 1, a regression line which was laid through the determined three values for the deformation work and its intersection with a predetermined percentage value of the deformation work in order to find a reduced closing force.

After recording the three values determined in the present embodiment, an evaluation is carried out, which is illustrated in FIG. 2:

The determined deformation works $\Delta W_1$, $\Delta W_2$ and $\Delta W_3$ are plotted in the said and displayed closing force—energy difference diagram and a linear extrapolation of the course of the deformation work over the closing force is carried out. For this purpose, a linear regression is preferably carried out, i.e. a "compensation line" is determined through the three recorded values of $\Delta W$. This procedure is sufficiently well known as such, so that it need not be explained further here.

According to the linear regression, the energy difference $\Delta W$ is proportional to the closing force F, i.e.

$$\Delta W \sim F_C$$

respectively $$\Delta W = \alpha \cdot F_C + \beta$$

wherein the coefficients $\alpha$ and $\beta$ are determined by the linear regression. After determining the mentioned coefficients, the closing force in the embodiment is reduced to a value of 20% of the last determined value for the energy difference $\Delta W_3$, i.e. the compensation line through the points $\Delta W_1$, $\Delta W_2$ and $\Delta W_3$ is intersected with a line parallel to the abscissa, which is at the level of 20% of the value of $\Delta W_3$. The reduced closing force found here is denoted by $F_C$ in FIG. 2. Mathematically expressed, the following applies to $F_C$ $$F_C = \frac{0,2 \cdot \Delta W_3 - \beta}{\alpha}$$

A new injection molding cycle is then started with the reduced clamping force $F_C$ found in this way. In this cycle, too, the mold deformation caused can be recorded and the deformation work $\Delta W_4$ introduced by the mold deformation can be calculated. This is illustrated in FIG. 3.

Figure 3:
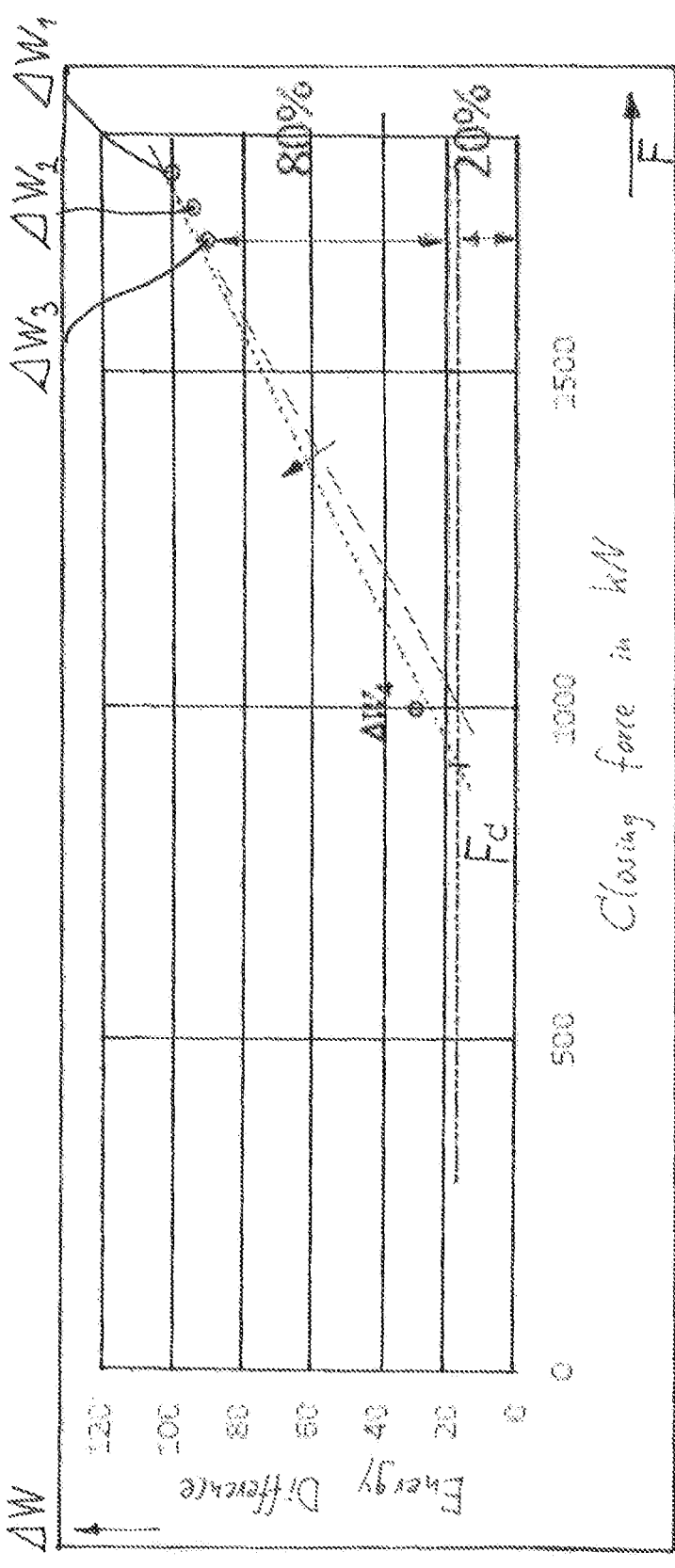
FIG. 3 shows schematically in the representation according to FIG. 2 an improved regression line, where a fourth value for the deformation work has been taken into account.

As can be seen from FIG. 3, a linear regression is now carried out again and the four values $\Delta W_1$, $\Delta W_2$, $\Delta W_3$ and $\Delta W_4$ now obtained are taken into account. In FIG. 3, an arrow indicates that the previously determined straight line is now shifted somewhat and thus a new, improved value for the reduced closing force $F_C$ can be determined. The basis for finding the reduced closing force $F_C$ is again the intersection of the compensation line with the parallel to the abscissa, which is at 20% of the value of $\Delta W_3$.

An improved value for the reduced closing force results from this because the first linear extrapolation was still too inaccurate due to the large prediction span (based on the values $\Delta W_1$, $\Delta W_2$ and $\Delta W_3$); the result can therefore be improved if the linear regression is repeated including the value $\Delta W_4$.

In the embodiment example, the reduced closing force was determined on the basis of a value of 20% of the value of the energy difference $\Delta W_3$. In general, an even lower value than 20% should be aimed for, ideally 5% of the energy difference of $\Delta W_3$.

However, in the range between 20% and 5% of the energy difference $\Delta W_3$, it can easily happen that the energy difference becomes negative, resulting in a detrimental uncontrolled opening of the mold during the injection molding process.

Therefore, preferably in this area, the step size for further reduction of the closing force is adjusted iteratively on the basis of the procedure described below. In this way, rapid changes are detected and taken into account.

Figure 4:
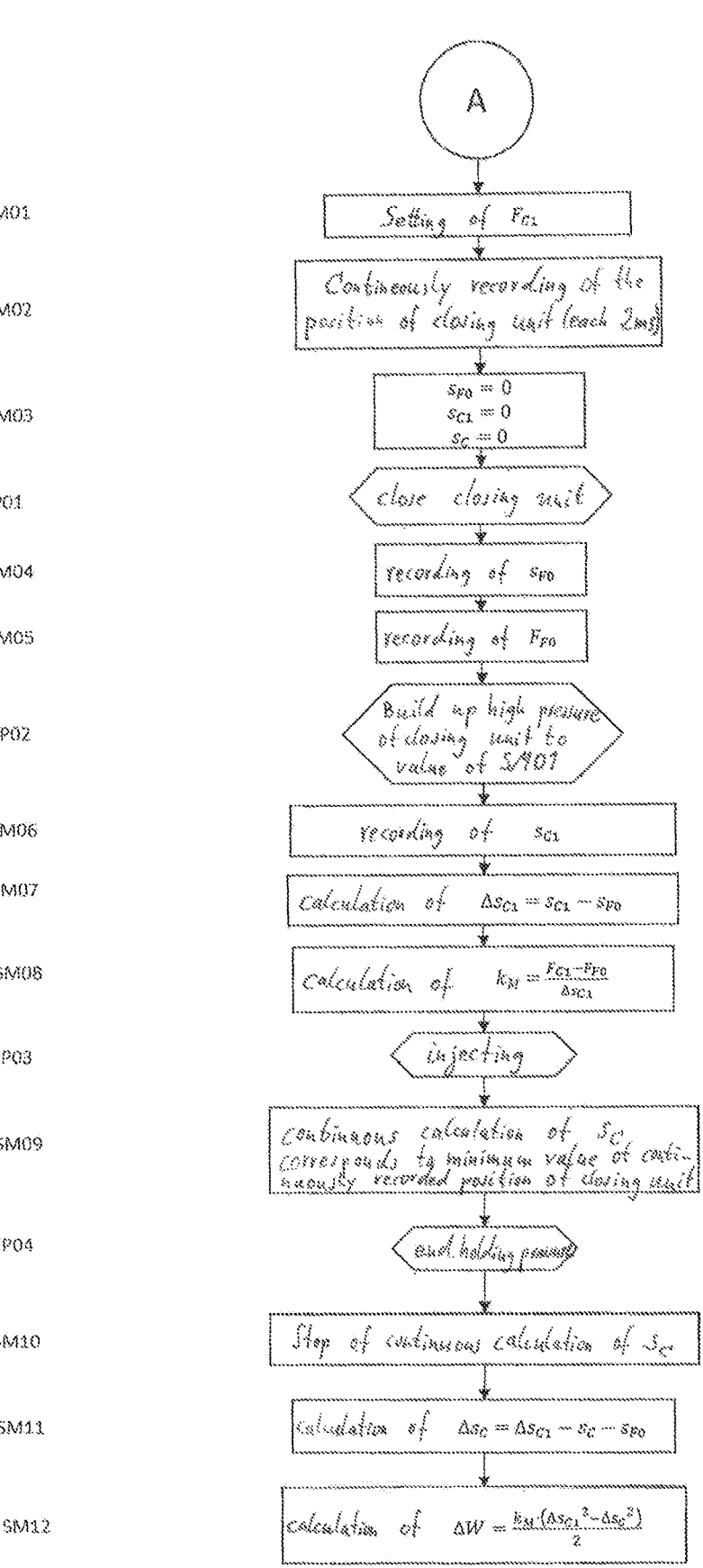
FIG. 4 shows the data acquisition procedure for an embodiment of the proposed method.
Figure 5:
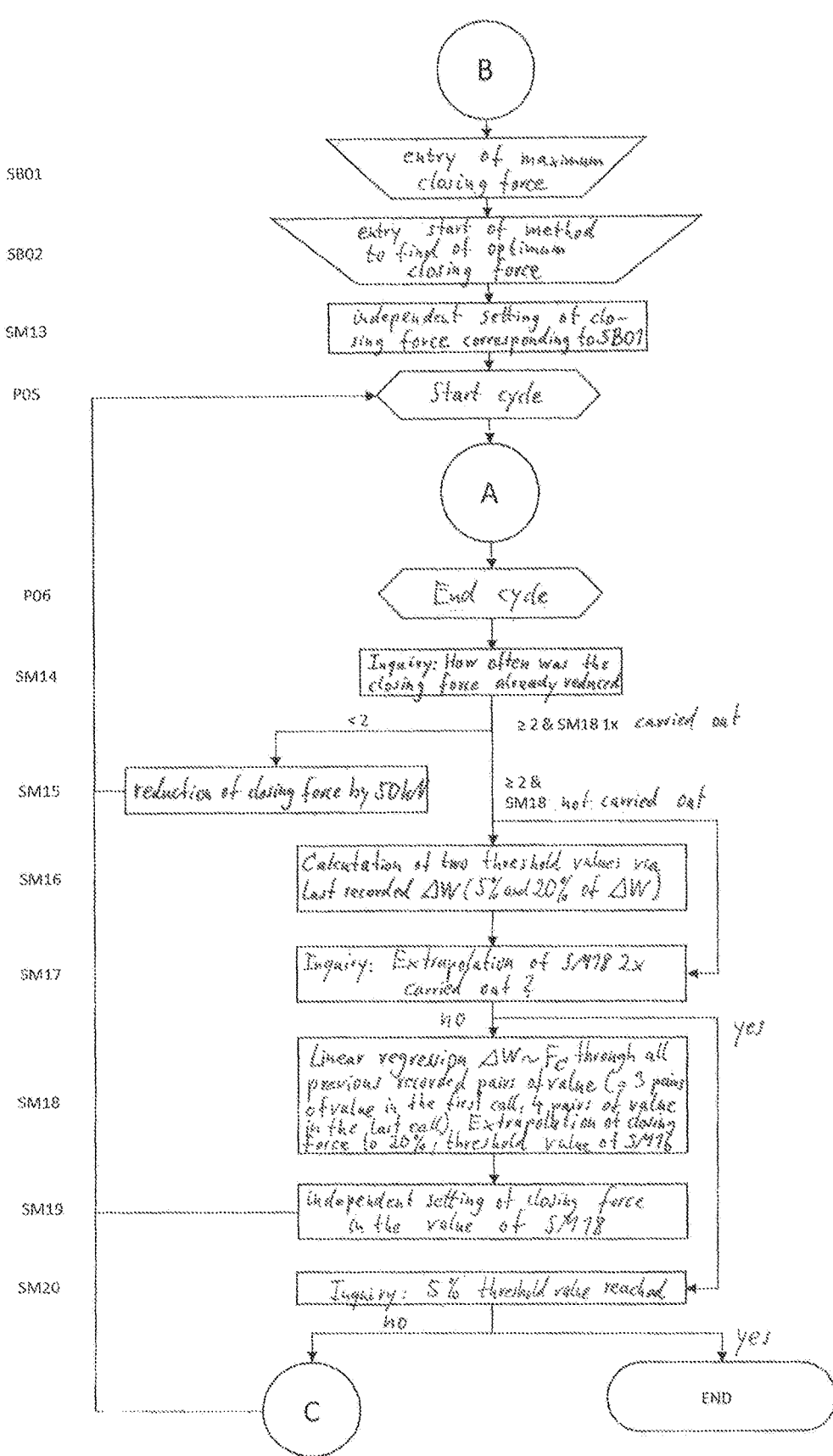

The entire algorithm provided for this purpose is shown in FIGS. 4, 5 and 6. FIG. 4 shows the data acquisition process, FIG. 5 the search for an optimum reduced clamping force, and FIG. 6 the procedure for iteratively reducing the clamping force.

For the iterative reduction of the closing force, FIG. 6 shows that when this partial algorithm is called (see process step "C" in the lower left corner of FIG. 5), three linear models are created (see step "SM21" in FIG. 6).

The first model determines a regression line through the last three data point pairs of $\Delta W$ and $F_C$. The result is the coefficients $\alpha_{S1}$ (slope) and $\beta_{S1}$ (intercept) for the regression line as explained above.

The second model calculates the regression line through the last and penultimate pair of data points of $\Delta W$ and $F_C$. The result is the coefficients $\alpha_{S2}$ (slope) and $\beta_{S2}$ (intercept) for the regression line.

The third model puts a regression line through the second to last and third to last pair of data points of $\Delta W$ and $F_C$. The result is the coefficients $\alpha_{S2}$ (slope) and $\beta_{S2}$ (intercept) for the regression line.

For the further calculation some limit values and constants are necessary. These values can be set on the machine. The values given in the sequence diagram (see FIG. 6, step "SM22") represent standard values. The step size $\Delta F_{Smin}$ determines the smallest possible change in the clamping force. The step size $\Delta F_{Smax}$ determines the largest possible change in the closing force. The attenuation factor $\tau$ and the maximum deviation $\Phi$ serve as factors for the exponential function described later. The threshold value for the relative deviation $\Phi$ indicates at which value of the relative deviation the sequence "C" (according to FIG. 6) should be aborted.

Once all three models are created, a weighted slope $\alpha_{Sw}$ is calculated. This is the sum of 70% of the slope from model 2 and 30% of the slope from model 3 (see step "SM23" in FIG. 6). The relative deviation $\mu$ (see step "SM24" in FIG. 6) results from the relation $$\mu = \frac{\alpha_{Sw}}{\alpha_{S1}} - 1$$

If the relative deviation $\mu$ is greater than the threshold value $\Phi$, it is assumed that a rapid change occurs. The sequence "C" (according to FIG. 6) is aborted, the penultimate closing force is set. If the relative deviation is smaller, the step size adjustment (see step "SM26" in FIG. 6) is performed by the equation $$\Delta F = (\Delta F_{Smax} - \Delta F_{Smin}) \cdot \exp\left(\frac{-\tau \cdot \mu}{\varphi}\right) + \Delta F_{Smin}$$

The new closing force is adjusted by the step size. The sequence is called up as often as necessary until the 5% mark of the differential work of $\Delta W_3$ has been reached.

The iterative reduction is repeated a maximum of ten times. After finding the optimum closing force, a certain value ($\Delta W_{REF}$) is obtained. This value serves as a reference for the subsequent process cycles. If an impermissible deviation of the differential work is detected in one of the subsequent cycles, the closing force is adjusted with a cycle delay via the linear approximation in order to return to the level of $\Delta W_{REF}$.

We claim:

1. A method for adjusting a closing force of a mold of a plastics processing machine, wherein the mold has a spring constant, so that a mold deformation results when the mold is subjected to the closing force, wherein the method comprises the following steps:

a in a first production cycle: Closing the mold with a nominal initial closing force and recording the mold deformation caused by this and calculating deformation work introduced by the mold deformation;

b) in a subsequent further production cycle: Closing the mold with a closing force which is reduced relative to the nominal initial closing force by a predetermined force difference and recording the mold deformation caused thereby and calculating the deformation work introduced by the mold deformation;

c) Recording the determined deformation works versus the closing force, performing a linear extrapolation of a course of the deformation works versus the closing force, and determining a reduced closing force which is at a predetermined percentage value of one of the previously determined deformation works, wherein the predetermined percentage value of the deformation work is at most 20% of the previously determined deformation work;

d) Execution of the subsequent further production cycle with the determined reduced closing force.

2. The method according to claim 1, wherein after step b) and before step c) the following step is performed:

b1) in a subsequent further production cycle following step b): Closing the mold with a closing force which is reduced by a predetermined force difference compared with the closing force during the execution of step b) and recording the mold deformation caused thereby and calculating the deformation work introduced by the mold deformation, wherein the further determined deformation work is taken into account in the linear extrapolation of the course of the deformation work versus the closing force when carrying out step c).

3. The method according to claim 2, wherein after step b1) and before step c) the following step is carried out:

b2) in a subsequent further production cycle following step b1): Closing the mold with a closing force which is reduced by a further predetermined force difference compared with the closing force during the execution of step b1) and recording the mold deformation caused thereby and calculating the deformation work introduced by the mold deformation, wherein the further determined deformation work is taken into account in the linear extrapolation of the course of the deformation work versus the closing force when carrying out step c).

4. The method according to claim 2, wherein the linear extrapolation is performed by a straight line determined by linear regression of values of the deformation works versus the closing force.

5. The method according to claim 1, wherein the force difference is between 25 kN and 75 kN.

6. The method according to claim 1, wherein it is carried out in an injection molding machine.

7. The method according to claim 5, wherein the force difference is between 40 kN and 60 kN.

* * * * *